United States Patent [19]

Villalobos et al.

[11] 4,413,427
[45] Nov. 8, 1983

[54] FUEL CONTROL SYSTEM FOR DRYER

[75] Inventors: Joseph A. Villalobos, Mahwah; Triffin G. Psyhojos, East Brunswick, both of N.J.

[73] Assignee: AER Corporation, Ramsey, N.J.

[21] Appl. No.: 288,124

[22] Filed: Jul. 29, 1981

[51] Int. Cl.³ .............................................. F26B 21/08
[52] U.S. Cl. ......................................... 34/46; 34/50; 34/54; 73/29
[58] Field of Search .................... 34/46, 50, 54, 114, 34/122; 250/343, 345, 339; 73/29

[56] References Cited

U.S. PATENT DOCUMENTS

| | | | |
|---|---|---|---|
| 2,876,357 | 3/1959 | Waters | 250/345 |
| 3,116,413 | 12/1963 | Schaefer et al. | 250/345 |
| 3,208,158 | 9/1965 | Smith, Jr. | 34/122 |
| 4,266,131 | 5/1981 | Ahjopalo et al. | 250/345 |
| 4,271,124 | 6/1981 | Specter | 250/345 |

*Primary Examiner*—Larry I. Schwartz
*Attorney, Agent, or Firm*—Shenier & O'Connor

[57] ABSTRACT

A system for optimizing the thermal efficiency of a dryer in which infrared radiation from a source outside the moisture carrying duct is directed into the duct to subject it to the action of the moisture-laden air in the duct to produce resultant radiation which is detected. In response to the detection, the flow of exhaust and fresh air is regulated to hold the moisture content of the air in the duct to a set value considered to be the optimum for the highest thermal efficiency of the dryer loop.

1 Claim, 5 Drawing Figures

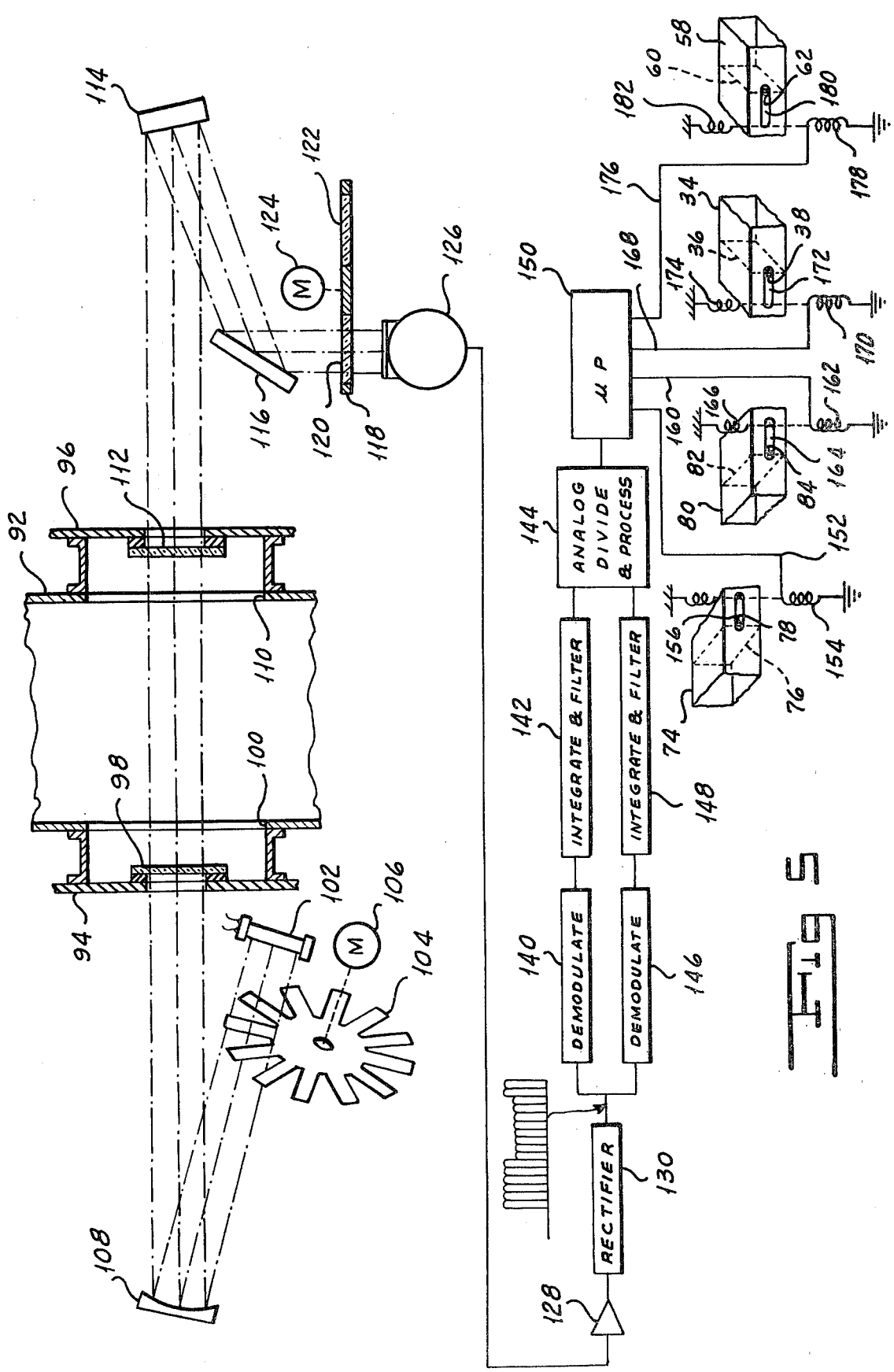

FUEL CONTROL SYSTEM FOR DRYER

BACKGROUND OF THE INVENTION

There are known in the prior art various dryers for drying the web formed in the course of making paper on a paper-making machine. One of the most widely used and effective dryers in the paper-making industry is the Yankee dryer. In this dryer, the web to be dried is passed over a dryer cylinder, the major portion of the periphery of which is enclosed by a hood. Hot drying air is supplied to the hood and is directed against the surface of the web and is then removed from the hood. Most of the systems are recirculating systems in which a certain portion of the air removed from the hood is returned thereto together with a predetermined amount of fresh, dry air. Another portion of the air removed from the hood is exhausted to the atmosphere.

Attempts have been made to optimize the drying rates without deleteriously affecting the quality of the paper produced. In order to achieve this result, relatively high temperature air and high velocity of the drying air has been employed. The excellent support for the web provided by the Yankee shell has made use of such high air velocities and mass flow possible.

One suggestion which has been advanced to increase the thermal efficiency of the Yankee dryer system is the preheating of the fresh air supplied to the system. Owing to the relatively small amount of fresh air used by a well designed Yankee unit, it has been discovered that little is gained by preheating the fresh air. Stated otherwise, it is a well established fact that fresh air usage and corresponding exhaust quantities are the major factors in determining the thermal efficiency of a given drying system. Specifically, in Yankee dryers the thrust of recent developments has been toward the reduction of fresh air input. Once the practical limit to the quantity of fresh air which must be used has been reached, the next step is the reduction of heat input in the recirculating system by preheating the fresh air. As has been pointed out, once the amount of fresh air required for the system has been minimized, preheating does not appear to have any appreciable effect in increasing the thermal efficiency of this system.

As the fresh air is reduced for a given water load input, the absolute humidity of the recirculating air increases and, through a given range, the system burner load shows a minimum point. The curve of burner load versus moisture pick-up at the minimum point is fairly flat. It can be demonstrated that once the system enters an absolute humidity range of 0.3 lb. of water per lb. of dry air up to 0.5 lb. of water per lb. of dry air, the system burner loads will be at their minimum.

From the foregoing, it will readily be apparent that optimization of the thermal efficiency of a dryer system can be achieved by controlling the operating point on the curve of burner load versus moisture pick-up. Such a control has not heretofore been achieved in modern dryer systems since no effective measure of the moisture pick-up in the air could be achieved. In dryers presently in use, the temperature of the air being removed from the dryer load ranges from about 500° F. to 600° F. Probes which have been used to measure humidity in relatively lower temperature installations have not proved effective, since their temperature tolerance is below about 200° F. A further complication is the presence of fibers in the air which might contaminate any probe placed in a duct adapted to carry moisture laden air.

SUMMARY OF THE INVENTION

One object of our invention is to provide a process for controlling the operation of a dryer which overcomes the defects of processes in the prior art.

Another object of our invention is to provide a process for controlling the operation of a paper machine dryer which optimizes the thermal efficiency of the dryer.

Another object of our invention is to provide a process for controlling the operation of a dryer to optimize the thermal efficiency thereof in a rapid and expeditious manner.

A still further object of our invention is to provide a process for increasing the thermal efficiency of a dryer, which process can be applied to existing installations.

Yet another object of our invention is to provide apparatus for optimizing the efficiency of a dryer system.

Another object of our invention is to provide a highly thermally efficient control system which is especially adapted for use on a Yankee dryer.

Still another object of our invention is to provide apparatus for optimizing the thermal efficiency of a dryer which is relatively simple and inexpensive for the results achieved thereby.

Other and further objects of our invention will appear from the following description.

BRIEF DESCRIPTION OF THE DRAWINGS

Referring now to the accompanying drawings to which reference is made in the instant specification, and in which like reference characters are used to indicate like parts in the various views:

FIG. 5 is a schematic view of our fuel control system for optimizing the thermal efficiency of a paper machine dryer.

DESCRIPTION OF THE PREFERRED EMBODIMENT

Figure 1:
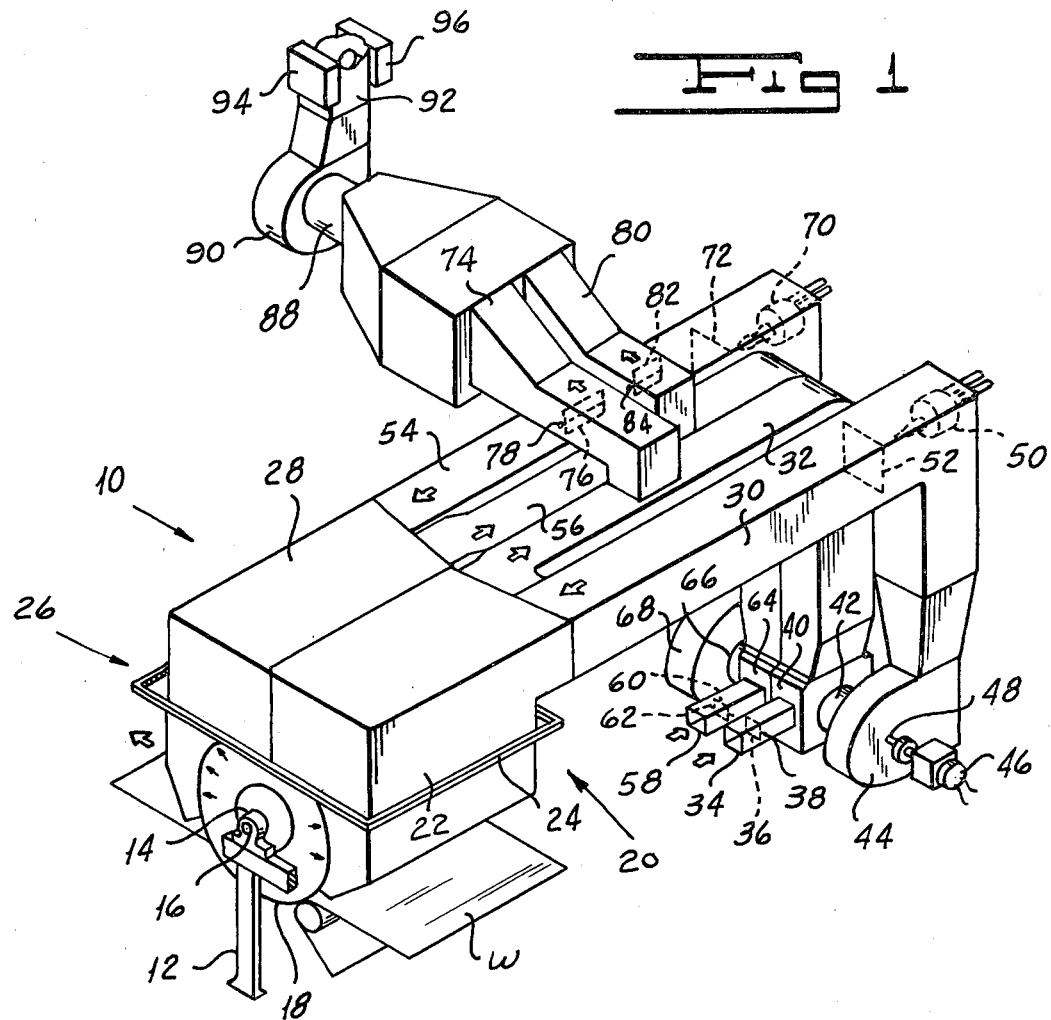
FIG. 1 is a partially schematic, perspective view of a typical Yankee dryer installation provided with one embodiment of our fuel control system for increasing the thermal efficiency of the dryer.

Referring now to FIG. 1 of the drawings, one type of paper machine dryer with which our fuel control system is especially adapted to be used, is a Yankee dryer indicated generally by the reference character 10, in which a frame 12 carries a bearing block 14, which rotatably supports the shaft 16 of a dryer roll 18. The web W of paper to be dried is guided around the major portion of the periphery of the dryer roll 18 in a manner known to the art.

The dryer 10 includes a wet end hood half indicated generally by the reference character 20, comprising a movable section 22 supported on a subframe 24. Frame 24 also supports the movable section 28 of the dry end half indicated generally by the reference character 26 of the dryer 10.

The wet end air inlet duct 30 is adapted to supply drying air to the section 22 in a manner to be described. After the drying air supplied to the section 20 has been directed against the surface of the web W, it is removed from the wet end hood half by a return duct 32. A wet end fresh air inlet duct 34 is adapted to supply a predetermined amount of fresh air to the wet end. In order to control the amount of dry air being fed into the wet end, duct section 34 is provided with a baffle 36 having a shaft 38 which may be positioned so as to regulate the amount of fresh air moving into the duct 34. Duct 34 leads into a mixing chamber 40 which also receives an input from the return duct 32 associated with the wet end 20. An outlet pipe 42 from the chamber 40 provides the input to a blower 44 adapted to be driven by a motor 46 having a shaft 48 in a manner known to the art. The output of the blower 44 provides the input to the duct 30. The mixture of fresh air and recirculating air which makes up the output of the blower 44, moves past a burner 50 and a screen 52 in the course of its movement toward the hood section 20. As is known, the burner 50 heats this inlet air to a predetermined degree.

The dry end 26 of the dryer 10 includes a dry end inlet duct 54 through which drying air is supplied to the hood section 28 so as to be brought into contact with the portion of the web W on the roll 18 within the section 26. The dry end return duct 56 carries air away from the section 26 after it has been brought into engagement with the web. A dry end fresh air inlet duct 58 is provided with a baffle 60 having a shaft 62 which is so positioned as to regulate the amount of fresh air being fed into the dry end of the system. Duct 58 leads into a mixing chamber 64 which is also fed by the return duct 56. The mixing chamber outlet pipe 66 provides the input to the dry end blower 68 which is driven by a motor (not shown) so as to supply drying air to the inlet duct 54. Air moving into the duct 54 travels past a burner 70 and screen 72, which heat the drying air to a predetermined temperature.

A wet end air removal duct 74 is provided with a baffle 76 and a shaft 78 which is positioned in a manner to be described hereinbelow to regulate the amount of air being removed from the wet end of the machine. A dry end air removal duct 80 has a baffle 82 provided with a shaft 84 which is positioned in a manner to be described hereinbelow to regulate the amount of air being removed from the dry end of the machine. Both of the ducts 74 and 80 lead into the inlet pipe 88 of a blower 90, the output of which leads to the main air removal duct 92 of the dryer. As will be described more fully hereinbelow, we provide the duct 92 with a source housing 94 in one wall thereof, and with an instrument housing 96 in the other wall thereof.

Figure 3:
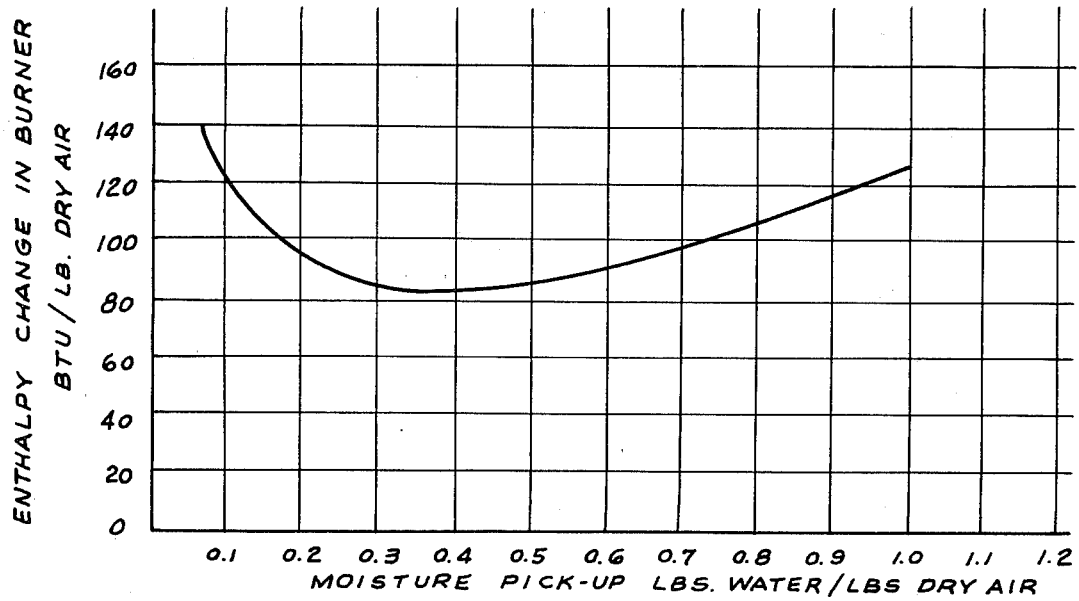
FIG. 3 is a graph illustrating the relationship between burner load and moisture level in the dryer system of FIG. 1.

Referring now to FIG. 3, which shows the burner load required for the system of FIG. 1 in BTU per pound of dry air, it is apparent that a decrease in heat requirements is obtained up to approximately 0.4 pounds of water per pound of air. If the moisture pick-up is increased further, the heat requirements will increase. At the lower humidities, from 100% fresh air to approximately 0.4 lb. of water per lb. of air, the decrease in heat requirements is obtained from the decrease in fresh air. As the moisture pick-up increases beyond this point, the greater quantities of water present in the recirculated air, along with the dry air, will require greater specific heat consumption in order to effect the same delivery temperature. This analysis indicates that from the standpoint of minimum fuel consumption, the specified system should be operated at a maximum moisture pick-up of approximately 0.4 lb. of water per lb. of air.

Figure 4:
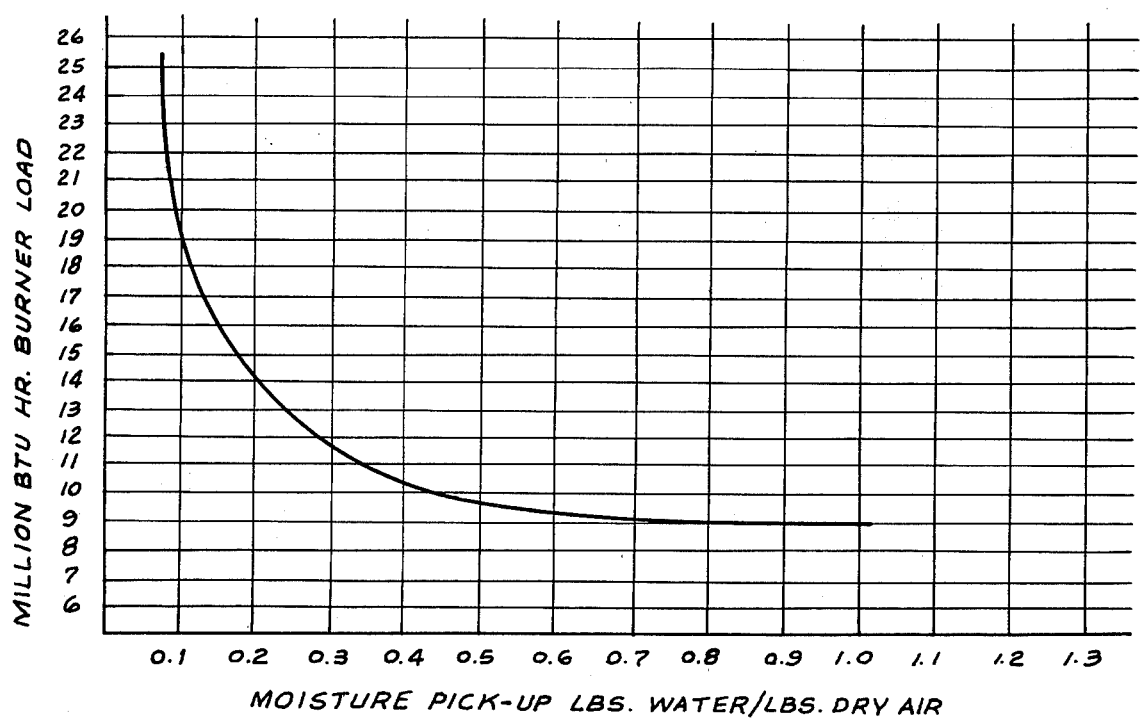
FIG. 4 is a graph illustrating the relationship between heat load and moisture pick-up in the dryer shown in FIG. 1.

Referring now to FIG. 4, we have shown the relationship between heat load in million BTU hours of burner load versus moisture pick-up in terms of pounds of water per pounds of dry air. The system conditions selected as being representative of a given system are an air circulating capacity of 2,000 pounds of dry air and a water removal load handling capacity of 150 pounds per minute with an operating temperature of 600° F.

FIG. 4 shows the heat load variations that can be expected from the system as the moisture pick-up changes. From the design point toward increased moisture pick-up, the heat requirements decrease at a very slow rate. From the design point toward the 100% fresh air condition, the heat requirements increase very rapidly. In this particular system, the heat requirements at the 100% fresh air condition are about $2\frac{1}{2}$ times the heat requirements at the design point.

Referring now to FIG. 5, we have shown one form of our system for causing the dryer to operate at a moisture pick-up of between approximately 0.3 and 0.5 lb. of water per lb. of dry air. We position a window 98 of housing 94 adjacent to an opening 100 at one side of the wall of duct 92. Housing 94 contains an infrared glow bar 102 which is energized to produce a beam of infrared radiation which is directed toward the shutter blades of a high frequency chopper wheel 104. Wheel 104 is driven by any suitable means such as a motor 106 at a speed to chop the infrared beam into a signal having a rate of approximately 800 Hz. The signal from the chopper is directed by a focusing mirror 108 through window 98 and along a target path through duct 92.

We provide the housing 96 with a window 112 adjacent to an opening 110 in the wall of duct 92 opposite to opening 100 so that the polychromatic signal travelling over the target path through duct 92 emerges through window 112. The emerging signal impinges on a focusing mirror 114 in housing 96 and is directed to a second mirror 116 which diverts the signal to a path which is parallel to the axis of rotation of a low speed signal chopper 118 made up of a narrow band pass optical filter 120 and a piece 122 of clear glass, or no filter. A motor 124 drives the chopper 118 to place the filter 120 in the path of the signal at 40 Hz. The signal emerging from chopper 118 is detected by an infrared detector 126 of any suitable type known to the art to produce a corresponding electrical output signal.

We apply the output signal of detector 126 to an amplifier 128 which feeds the signal to a rectifier 130 which produces an output signal of the type indicated by the arrow adjacent to the output channel thereof. This signal is a signal of the frequency of the first chopper modulated by the frequency of the second chopper with the two levels of the signal representing respectively the absorption intensity and the continuum intensity. The output signal from the rectifier 130 passes through respective demodulators 140 and 146 and respective integrator and filter networks 142 and 148 to analog divider included in block 144 which provides an output signal which is representative of the ratio of the signal in the absorption region to that in the continuum region. Stated otherwise, a comparison is made between the intensity of the signal at a specific wavelength region where it is uniquely absorbed by the moisture molecules along the path and compares it with the reference signal intensity it receives in an adjacent non-absorbing wavelength region. Since both signals used in the ratio have traversed the same target path, we thus use a constant, stable signal unaffected by intermittent signal variations and signal deterioration respectively caused by high particle loading and time with dirty process conditions. The block 144 incorporates further processing circuitry to cause its output to be a measure of, if not directly proportional to, the moisture content of the exhaust passing outwardly through the stack 92. In this form, the signal is able to be employed in a microprocesser 150 of any suitable type known to the art to provide the required control signal. While the signal may be an analog signal, it is also possible to convert it to a digital signal for ease in handling where required. The microprocesser 150 and whatever associated circuitry is required, puts out a first signal on a line 152 for energizing a solenoid 154 to position a crank 156 on shaft 78 against the action of a spring 158 so that the baffle 76 controls the flow of exhaust air from the wet end of the dryer through the duct 74. Microprocesser 150 and its associated circuitry put out a second signal on line 160 to energize a solenoid 162 to position a crank 164 on shaft 84 against the action of a spring 166 so that baffle 82 regulates the flow of exhaust air from the dry end of the dryer to the heat exchanger 86. As is pointed out hereinabove, the microprocesser is so set as to cause the system to tend to operate at the desired point of between 0.3 and 0.5 lb. water per lb. of air in the duct 92.

In order to provide the proper balance within the dryer loop it is necessary to control not only the quantity of air removal from the dryer section but also to control the quantity of fresh air being introduced into the loop through ducts 34 and 58. To this end microprocesser 150 includes a third output channel 168 carrying a signal for energizing a solenoid 170 to move a crank 170 on the end of shaft 38 against the action of a spring 174 to position baffle 36, thus to regulate the introduction of fresh air into the wet end of the machine. A fourth microprocesser output channel 176 is adapted to energize a solenoid 178 to move a crank 180 on shaft 62 against the action of a spring 182 to position baffle 60 to regulate the amount of fresh air being introduced into the wet end of the machine.

It is to be noted that, while in FIG. 1, we have shown the site of the moisture measurement to be in duct 92, the measurement may be made in any duct within the dryer circuit or loop. It may, for example, be in any one of the ducts 32, 56, 74, 80 and 92. In multiple zone dryers, the choice of locations is even greater. It is to be emphasized that, once the moisture sensing instrument is able to detect and control the level of moisture content, this controlled function can be effected from any of the ducts that are feeding air to or extracting air from the dryer. The only difference is that the moisture sensor will have to be set at a different control point.

Figure 2:
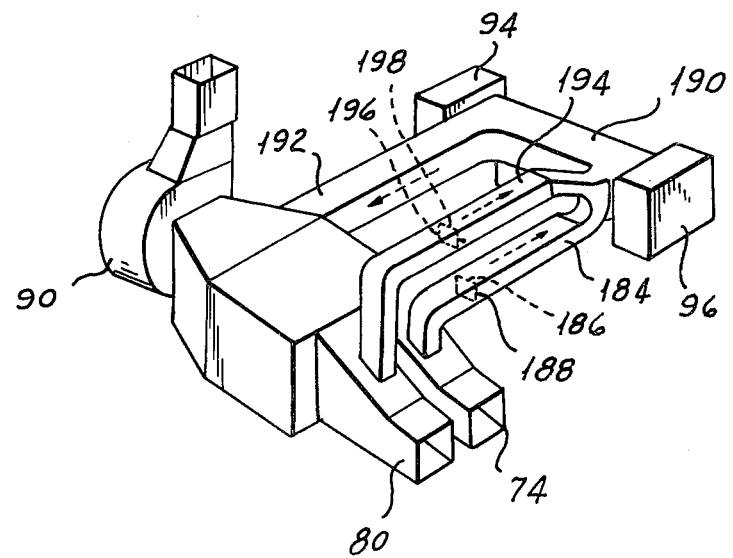
FIG. 2 is a fragmentary view of an alternate embodiment of our fuel control system for increasing the thermal efficiency of a dryer.

It may be desirable to use a single instrument at a bypass location and alternatively feed air from a pair of ducts. Referring to FIG. 2, we provide a duct 184 having a baffle 186 operated by a shaft 188 for conveying moisture laden air from the wet end removal duct to a bypass duct section 190 at the ends of which we place the source housing 94 and the instrument housing 96. A return duct section 192 carries air from bypass section 100 to the input to blower 90. A duct 194 having a baffle 196 adapted to be operated by a shaft 198 connects the dry end removal duct 80 to bypass section 190. It will readily be appreciated that by operating baffles 186 and 196 we may selectively and alternatively subject air from the return ducts 74 and 80 to the action of the control system. We may thus monitor and control the two zones separately with a single instrument.

In operation of a dryer provided with our system, the blowers, burners and fresh air inlet ducts are set for typical operating conditions discussed hereinabove in connection with the showing of FIG. 4. Next, the microprocesser 150 is so set as to cause our system to regulate the flow of air through a duct such as duct 92 so that the air flowing outwardly through the duct has the desired water content of approximately 0.3 to 0.5 lbs. per lb. of fresh air. At the same time the fresh air input at ducts 34 and 58 is regulated. In response to any deviation of the water content of the air from this value, the microprocesser will position the various duct dampers to restore the moisture content to the desired value. Moreover, as is evident from FIG. 3, with the moisture content thus regulated, the fuel efficiency of the dryer system is optimized.

It will be seen that we have accomplished the objects of our invention. We have provided a process for controlling the operation of a paper machine dryer which overcomes the defects of processes of the prior art. Our process optimizes the thermal efficiency of the dryer. We have, moreover, provided apparatus for carrying out our process which is relatively simple and inexpensive for the result achieved thereby. Our apparatus operates in a rapid and expeditious manner.

It will readily be appreciated that, while we have shown and described our system in connection with a paper machine dryer, it is equally applicable to other dryer systems.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a dryer system, an exhaust duct and a plurality of dryer sections each comprising a fresh air supply and a recirculating air system and a burner for directly heating drying air and a removal duct though which moisture-laden air is carried away from each of the sections at a temperature in excess of 250° F., said system including a bypass duct section, means connecting one end of said bypass duct section to said exhaust duct, means for selectively directing air from said section removal ducts into the other end of said bypass duct, a radiant energy source located outside said bypass duct section, means for directing radiation from said source into said bypass duct section to subject moisture-laden air therein to the action of said radiation to produce resultant radiation, means located outside said bypass duct section for detecting said resultant radiation and means responsive to said detecting means for controlling the proportion of recirculated to fresh air in the removal duct connected to the other end of the bypass duct by regulating the fresh air introduced into each of the sections through said fresh air supply to thereby regulate the moisture content of the air in said last-named duct and in said dryer sections.

* * * * *